(12) United States Patent
Witek

(10) Patent No.: US 6,322,664 B1
(45) Date of Patent: Nov. 27, 2001

(54) METHOD OF PROCESSING RECYCLED WASTE PAPER BY SEPARATING FIBERS OF DIFFERENT COLORS

(75) Inventor: Werner Witek, Appleton, WI (US)

(73) Assignee: Voith Sulzer Paper Technology North America, Inc., Appleton, WI (US)

(*) Notice: Subject to any disclaimer, the term of this patent is extended or adjusted under 35 U.S.C. 154(b) by 0 days.

(21) Appl. No.: 09/690,493

(22) Filed: Oct. 17, 2000

(51) Int. Cl.⁷ .............................. D21H 11/14; D21B 1/32
(52) U.S. Cl. .............................. 162/4; 162/55; 241/24.29; 241/27; 241/29; 241/79.3
(58) Field of Search .................................. 162/4, 55, 23, 162/7; 209/17, 170; 210/221.2, 295; 241/24.29, 27, 28, 29, 79.3, 183

(56) References Cited

U.S. PATENT DOCUMENTS

| | | | |
|---|---|---|---|
| 5,733,412 | * | 3/1998 | Markham et al. ........................ 162/6 |
| 5,766,448 | * | 6/1998 | Markham .............................. 209/168 |
| 6,000,640 | | 12/1999 | Krebs et al. ....................... 241/24.29 |

* cited by examiner

Primary Examiner—Dean T. Nguyen
(74) Attorney, Agent, or Firm—Taylor & Aust, P.C.

(57) ABSTRACT

A method of processing recycled waste paper includes pulping waste paper in a first drum pulper. White fibers are separated from the waste paper in a first screen drum. The white fibers are then processed by screening, cleaning, deinking and bleaching. The remaining waste paper is pulped within a second drum pulper. The brown fibers are separated from the waste paper in a second screen drum. The brown fibers are processed by screening, cleaning and bleaching.

18 Claims, 1 Drawing Sheet

METHOD OF PROCESSING RECYCLED WASTE PAPER BY SEPARATING FIBERS OF DIFFERENT COLORS

BACKGROUND OF THE INVENTION

1. Field of the Invention

The present invention relates to a method of processing recycled waste paper, and more particularly, to a method of processing a mixture of different types of waste paper.

2. Description of the Related Art

A stock preparation system is used to prepare a fiber suspension for use within a paper-making machine. Typically, the stock preparation system receives a source of fiber, such as wood or recycled waste paper. The fiber source is then broken down into individual fibers and further processed such as by screening, cleaning, deinking and bleaching to prepare the fiber suspension with physical properties suitable for the manufacture of the fiber web.

Recycled waste paper includes both white fibers and brown fibers, depending upon the source of the recycled waste paper. For example, recycled waste paper with brown fibers may be in the form of old corrugated carton (OCC) and/or sack paper. Recycled waste paper with white fibers may be in the form of news print, magazine, printing paper and/or writing paper. The white fibers typically were processed to a greater extent relative to the brown fibers when previously used in the paper-making process. Accordingly, the white fibers have physical properties such as fiber length, adhesion properties, etc. which are different from the brown fibers. Given the different physical properties between white fibers and brown fibers, it may be desirable to process the white fibers separately from the brown fibers to manufacture a fiber suspension. A known technique is to separate waste paper made from white fibers from waste paper made from brown fibers prior to the stock preparation processing. However, separating and sorting the white fibers from the brown fibers is time consuming and expensive.

It is also known to merely mix the white fibers and brown fibers together and use the resultant fiber suspension for the production of a suitable fiber web. However, mixing the white fibers and brown fibers together limits the types of fiber webs which may be produced with the resultant fiber suspension, and may not be the best use of the different types of fibers within the recycled waste paper.

What is needed in the art is a method of processing recycled waste paper which does not require pre-sorting of waste paper having both white fibers and brown fibers, and provides improved flexibility in terms of different types of fiber suspensions which may be produced using the mixed waste paper.

SUMMARY OF THE INVENTION

The present invention provides a method of processing recycled waste paper wherein white fibers and brown fibers are separated from each other during stock preparation and separately processed for subsequent manufacture of different types of fiber webs.

The invention comprises, in one form thereof, a method of processing recycled waste paper. The waste paper is pulped in a first drum pulper. White fibers are separated from the waste paper in a first screen drum. The white fibers are then processed by screening, cleaning, deinking and bleaching. The remaining waste paper is then pulped within a second drum pulper. The brown fibers are separated from the waste paper in a second screen drum. The brown fibers are processed by screening, cleaning and bleaching.

An advantage of the present invention is that waste paper including both white fibers as well as brown fibers may be processed in a continuous manner.

Another advantage is that white fibers and brown fibers are separated from each other during stock preparation and further processed in parallel.

Yet another advantage is that the white fibers and brown fibers may be separately used for the manufacture of different types of fiber webs, or may be mixed together for the manufacture of a fiber web.

A further advantage is that the screen separators used to separate the white fibers and the brown fibers from the waste paper may be configured as screen drums which provide effective screening while being simple and low cost.

BRIEF DESCRIPTION OF THE DRAWING

The above-mentioned and other features and advantages of this invention, and the manner of attaining them, will become more apparent and the invention will be better understood by reference to the following description of an embodiment of the invention taken in conjunction with the accompanying drawing, which is a flow chart illustrating an embodiment of the method of the present invention for processing recycled waste paper.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
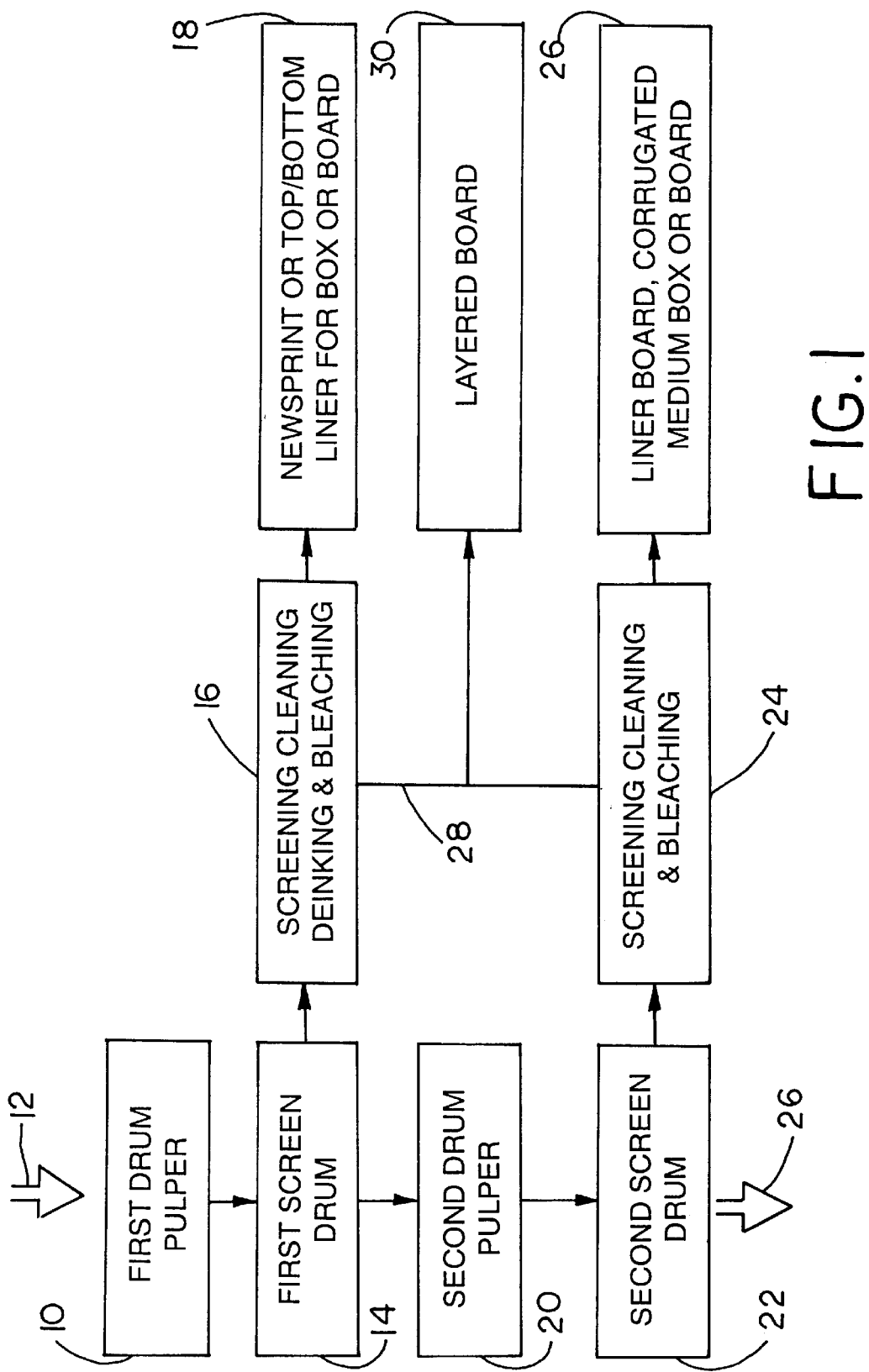

Referring now to the drawing, there is shown an embodiment of a method of processing recycled waste paper of the present invention. The method of the present invention is applicable to the recycling of curb side (household) waste paper including both bleached as well as unbleached fibers. The bleached fibers, referred to as white fibers herein, include news print, magazine, printing paper and/or writing paper. The unbleached fibers, referred to as brown fibers herein, include old corrugated carton (OCC) and/or sack paper.

First, the waste paper with both white fibers and brown fibers is introduced to a first drum pulper 10, as indicated by arrow 12. The white fibers and brown fibers have different physical properties relative to each other. For example, the white fibers and brown fibers typically have fibers with different lengths and adhesion properties. The white fibers are generally easier to pulp than the brown fibers because of the physical properties associated therewith. First drum pulper 10 is configured and operated in a manner such that most of white fibers are pulped without pulping the brown fibers. For example, the magnitude of agitation, added water and retention time within first drum pulper 10 are configured such that most of the white fibers are pulped while the brown fibers remain in an unpulped state. An example of a drum pulper which may be used with the method of the present invention is disclosed in U.S. Pat. No. 6,000,640 (Krebs, et al.), assigned to the assignee of the present invention.

Next, the partially pulped waste paper is transported from first drum pulper 10 to a first screen separator 14. In the embodiment shown, first screen separator 14 is in the form of a screen drum. First screen drum 14 may be of conventional design with a rotating drum having a plurality of through holes. However, the particular configuration of first screen drum 14 is such that white fibers previously pulped within first drum pulper 10 are screened and thereby separated from brown fibers remaining substantially in an unpulped state.

The screened white fibers are then further processed for subsequent use in a machine for manufacturing a fiber web. More particularly, the white fibers are processed by screening, cleaning, deinking and bleaching (block 16). The processed white fibers are prepared as a suspension suitable for use in a machine for making a fiber web utilizing white fibers. For example, the prepared fiber suspension with white fibers may be used to make a fiber web suitable for news print and/or a top/bottom liner for box or board utilizing the white fibers separated in first screen drum 14 (block 18).

The waste paper which is not screened within first screen drum 14 is transported to a second drum pulper 20 where substantially all of the remainder of the waste paper is pulped. Second drum pulper 20 is thus configured with a magnitude of agitation, added water and retention time sufficient to carry out pulping of nearly all the waste paper not screened by first screen drum 14. The pulped waste paper is then transported to a second screen separator 22. In the embodiment shown, second screen separator 22 is in the form of a second screen drum, but may be configured as a different type of screen separator depending upon the particular application. Second screen drum 22 functions to screen the brown fibers from the waste paper.

The screened brown fibers are further processed for subsequent use in a machine for manufacturing a fiber web (block 24). More particularly, the brown fibers are screened, cleaned and bleached and suspended within a fiber suspension. The fiber suspension is used within a machine for manufacturing a fiber web suitable for use as liner board, corrugated medium box and/or board (block 26).

The remainder of the waste paper which is not screened within second screen drum 22 is discarded as trash to a land fill or incinerator, as indicated by arrow 26. The discarded remainder of the waste paper may include trash, contaminants and unpulped portions of the waste paper.

As described above, conventional waste paper stock preparation systems merely combine white fibers with brown fibers for preparation of a fiber suspension used by a fiber web manufacturing machine. The present invention separates white fibers from brown fibers so that the white fibers and brown fibers may be further processed and utilized separately. However, the present invention also provides the advantage of allowing the white fibers and brown fibers to be mixed in any suitable proportion relative to each other for use within a fiber suspension (line 28). The apparatus used to mix the white fibers with the brown fibers may be of conventional design, depending upon the particular application and thus will not be described further. Suffice it to say that the white fibers and brown fibers may be separately processed and then mixed together in any desired proportion for the manufacture of a fiber web. For example, a fiber suspension with a predetermined mixture of white fibers and brown fibers may be utilized to make layered board within a layered board machine (block 30).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of processing recycled waste paper, comprising the steps of:
    pulping the waste paper in a first drum pulper;
    separating white fibers from the waste paper in a first screen separator;
    pulping remaining waste paper from said first screen separator in a second drum pulper; and
    separating brown fibers from the waste paper in a second screen separator.

2. The method of processing recycled waste paper of claim 1, including the steps of:
    processing the white fibers, including the sub-steps of screening, cleaning, deinking and bleaching the whiter fibers; and
    processing separately the brown fibers, including the sub-steps of screening, cleaning and bleaching the brown fibers.

3. The method of processing recycled waste paper of claim 2, including the board utilizing an output from said step of processing the white fibers.

4. The method of processing recycled waste paper of claim 2, including the step of making a fiber web suitable for one of liner board, corrugated medium box and board utilizing an output from said step of processing separately the brown fibers.

5. The method of processing recycled waste paper of claim 2, including the step of mixing white fibers and brown fibers outputted from each of said processing steps.

6. The method of processing recycled waste paper of claim 5, including the step of making layered board using a mixture from said mixing step.

7. The method of processing recycled waste paper of claim 1, said white fibers including at least one of news print, magazine, printing paper and writing paper.

8. The method of processing recycled waste paper of claim 1, said brown fibers including at least one of old corrugated carton and sack paper.

9. The method of processing recycled waste paper of claim 1, including the step of discarding the remainder of the waste paper.

10. The method of processing recycled waste paper of claim 1, wherein at least one of said first screen separator and said second screen separator comprises a screen drum.

11. A method of processing recycled waste paper, comprising the steps of:
    pulping the waste paper in a first drum pulper;
    separating white fibers from th e waste paper in a first screen drum;
    processing the white fibers, including the sub-steps of screening, cleaning, deinking and bleaching the whiter fibers;
    pulping remaining waste paper from said first screen drum in a second drum pulper;
    separating brown fibers from the waste paper in a second screen drum; and
    processing the brown fibers, including the sub-steps of screening, cleaning and bleaching the brown fibers.

12. The method of processing recycled waste paper of claim 11, including the step of making a fiber web suitable for one of news print and a top/bottom liner for one of box and board utilizing an output from said step of processing the white fibers.

13. The method of processing recycled waste paper of claim 11, including the step of making a fiber web suitable for one of liner board, corrugated medium box and board utilizing an output from said step of processing the brown fibers.

14. The method of processing recycled waste paper of claim 11, including the step of mixing white fibers and brown fibers outputted from each of said processing steps.

15. The method of processing recycled waste paper of claim 14, including the step of making layered board in a board machine using a mixture from said mixing step.

16. The method of processing recycled waste paper of claim 11, said white fibers including at least one of news print, magazine, printing paper and writing paper.

17. The method of processing recycled waste paper of claim 11, said brown fibers including at least one of old corrugated carton and sack paper.

18. The method of processing recycled waste paper of claim 11, including the step of discarding the remainder of the waste paper.

* * * * *

UNITED STATES PATENT AND TRADEMARK OFFICE
CERTIFICATE OF CORRECTION

PATENT NO.    : 6,322,664 B1
DATED         : November 27, 2001
INVENTOR(S)   : Werner Witek It is certified that error appears in the above-identified patent and that said Letters Patent is hereby corrected as shown below:

<u>Column 4,</u>
Line 25, after "the", insert -- step of making a fiber web suitable for one of news print and a top/bottom liner for one of box and --; and
Line 53, delete "th e", and substitute -- the -- therefor.

Signed and Sealed this

Twenty-ninth Day of April, 2003

JAMES E. ROGAN
*Director of the United States Patent and Trademark Office*